INVENTOR.
RALPH W. HILL
BY
ATTORNEY

INVENTOR.
RALPH W. HILL
BY
ATTORNEY

Nov. 1, 1960    R. W. HILL    2,958,218
AUTOMATIC CUSTODY TRANSFER OF CRUDE OIL
Filed April 30, 1958    4 Sheets-Sheet 3
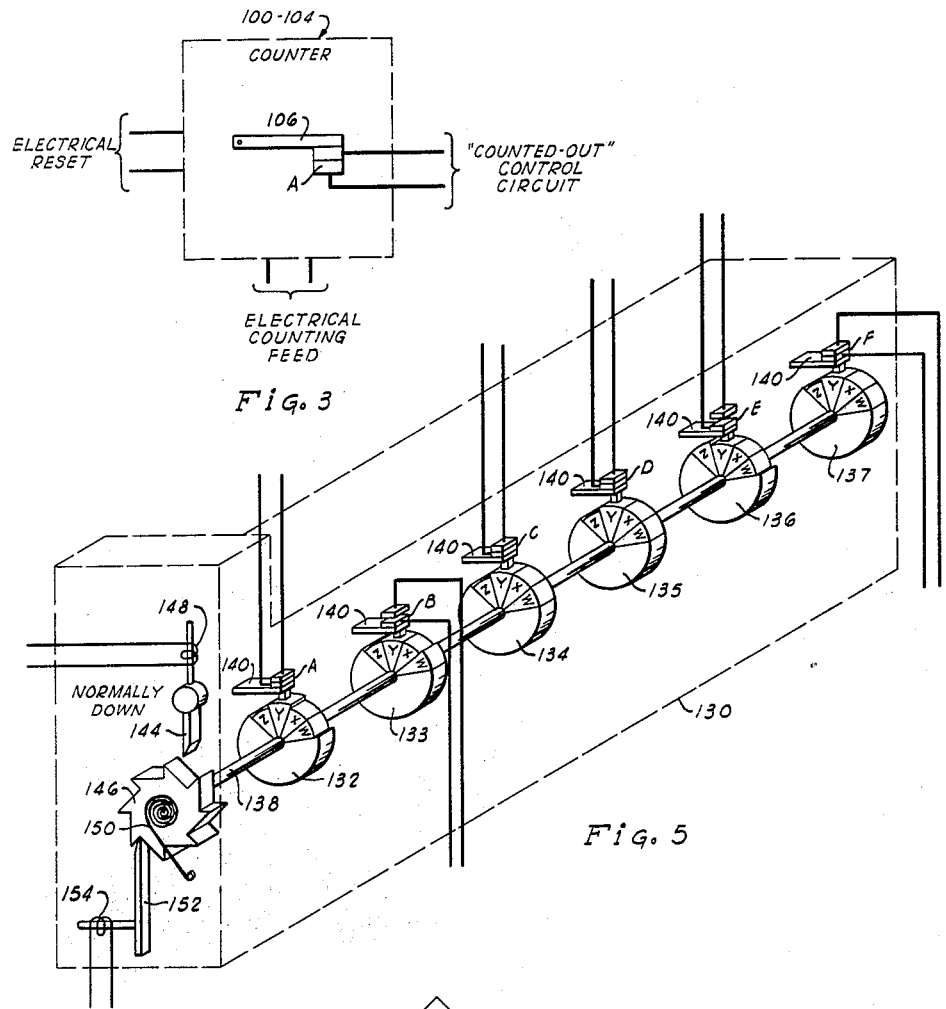
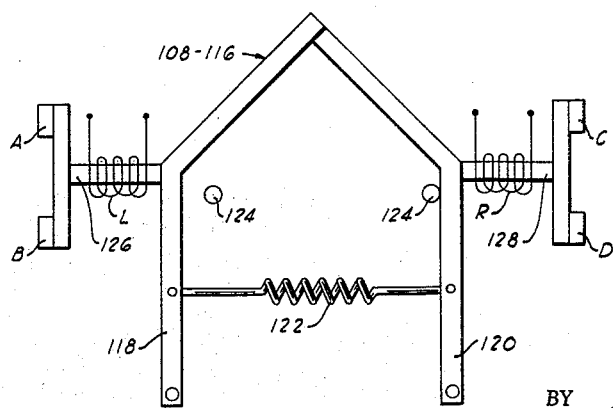
INVENTOR.
RALPH W. HILL
BY
ATTORNEY

INVENTOR.
RALPH W. HILL
BY
ATTORNEY

United States Patent Office 2,958,218
Patented Nov. 1, 1960

2,958,218

AUTOMATIC CUSTODY TRANSFER OF CRUDE OIL

Ralph W. Hill, Tulsa, Okla., assignor to Major Engineering Company, Tulsa, Okla., a corporation of Oklahoma Filed Apr. 30, 1958, Ser. No. 732,100

13 Claims. (Cl. 73—3)

This invention relates generally to improvements in the art of automatically transferring the custody of crude oil from a producing lease to a receiving pipeline, and more particularly, but not by way of limitation, to an improved method and system of automatically transferring the custody of crude oil by continuous use of a production meter and periodic use of a check meter, and a novel method of correlating the measurements of the two meters.

As it is well known in the art, the time-honored method of transferring the custody of crude oil from a producer to a receiving pipeline company involves the storage of the crude oil from a particular lease in one or more storage tanks. Before physically transferring the oil from the storage tanks to the receiving pipeline, the tanks are manually gauged by gaugers from both the producing company and the pipeline company to determine the amount of oil that is actually transferred. This method involves a large amount of storage equipment, as well as many man hours for gauging and testing operations. Therefore, the producing and pipeline divisions of the oil industry have been recently considering systems for automatically measuring and transferring custody of the oil at the side of the lease.

Experience and substantial testing has shown the industry that a positive displacement meter will provide the required accuracy when measuring crude oil. However, such meters inherently tend to drift and cause minor errors in the measurement of the oil flow, and, of course, the meters must be guarded against complete failure. In other words, it has been found advisable to at least periodically prove the positive displacement meters. Fundamentally, two basic tools are available for checking the performance of a positive displacement meter; a check tank and a check meter. Calibrated check or prover tanks have been found to be desirable in many types of installations, but since they have no relation to the present invention, they will not be discussed in detail herein.

Check meters may be used in a custody transfer system in two different ways; that is, either continuously or periodically. Several prior workers in the art have devised systems wherein the production meter and the check meter are connected either in series or parallel in such a manner that both of the meters continuously measure equal volume of oil. The meters are ordinarily interconnected by some sort of control system for the purpose of sounding an alarm or stopping the flow of oil when the difference in the measurements of the two meters exceeds a predetermined maximum. Up to the present time, such control systems have been mechanical systems involving a differential gear arrangement to correlate the measurements of the two meters, thereby placing an additional load on the meters. When the meters are used continuously, both meters are, of course, subjected to substantial wear, such that both meters will tend to develop errors in the same direction to nullify the primary function of the check meter, and the maintenance of the transfer system is unduly increased. Up to the present time, no transfer system involving the periodic use of a check meter has been widely accepted in the industry.

The present invention contemplates a novel automatic custody transfer system wherein the preformance of a production meter is periodically checked by a check meter which is a permanent part of the transfer system. In accordance with this invention, oil is directed only through the production meter the majority of the time. At periodic intervals, such as once a day, the check meter is automatically connected in series with the production meter for a limited period of time to check the performance of the production meter. At the end of the check period, the check meter is automatically isolated or by-passed, providing the error of the production meter does not exceed a predetermined maximum. Also, this invention contemplates a novel method and system for determining the degree of difference in the measurement of the production and check meters during each check period, including an alarm system for progressively indicating the difference in measurements of the two meters, and controls for stopping further flow through the system when the difference in the measurements of the two meters exceeds a predetermined maximum during any check period. In the preferred embodiment, the difference measuring, alarm, and control systems are operated electrically to provide precise control and minimize wear of the system by the use of a minimum of mechanical movements.

An important object of this invention is to provide a reliable automatic custody transfer system which does not require substantial attention by representatives of the producing or pipeline companies.

Another object of this invention is to provide a novel check meter system wherein the check meter will be subjected to a minimum of use and will retain its accuracy over an extended period of time.

Another object of this invention is to provide a novel automatic custody transfer system utilizing a check meter, wherein the check meter is automatically by-passed the majority of the time the system is in use, and is automatically placed in use only periodically for limited periods of time.

A further object of this invention is to provide a novel method and system for determining the degree of difference in the measurements of two meters.

Another object of this invention is to provide an automatic custody transfer system utilizing a production meter and check meter, wherein relatively small differences in the measurements of the two meters will be automatically indicated, and the system will be automatically shut down when the difference in the measurements of the two meters exceeds a predetermined maximum.

Another object of this invention is to provide a completely automatic custody transfer system for transferring crude oil from a producing company to a pipeline company, wherein the companies will be assured that the oil transfered will be of a precise quantity and will have predetermined minimum qualities.

A still further object of this invention is to provide a novel automatic custody transfer system which may be economically manufactured, will require a minimum of maintenance service and will have a long service life.

Other objects and advantages of the invention will be evident from the following detailed description, when read in conjunction with the accompanying drawings which illustrate my invention.

In the drawings:

Figure 3 is a wiring diagram for a typical remote counter used in the preferred embodiment of this invention.

Figure 4 is a schematic illustration of a latching relay of the type used in the preferred embodiment of this invention.

Figure 5 is a schematic perspective view of a stepping switch or accumulator used in the preferred embodiment of this invention.

Figure 1:
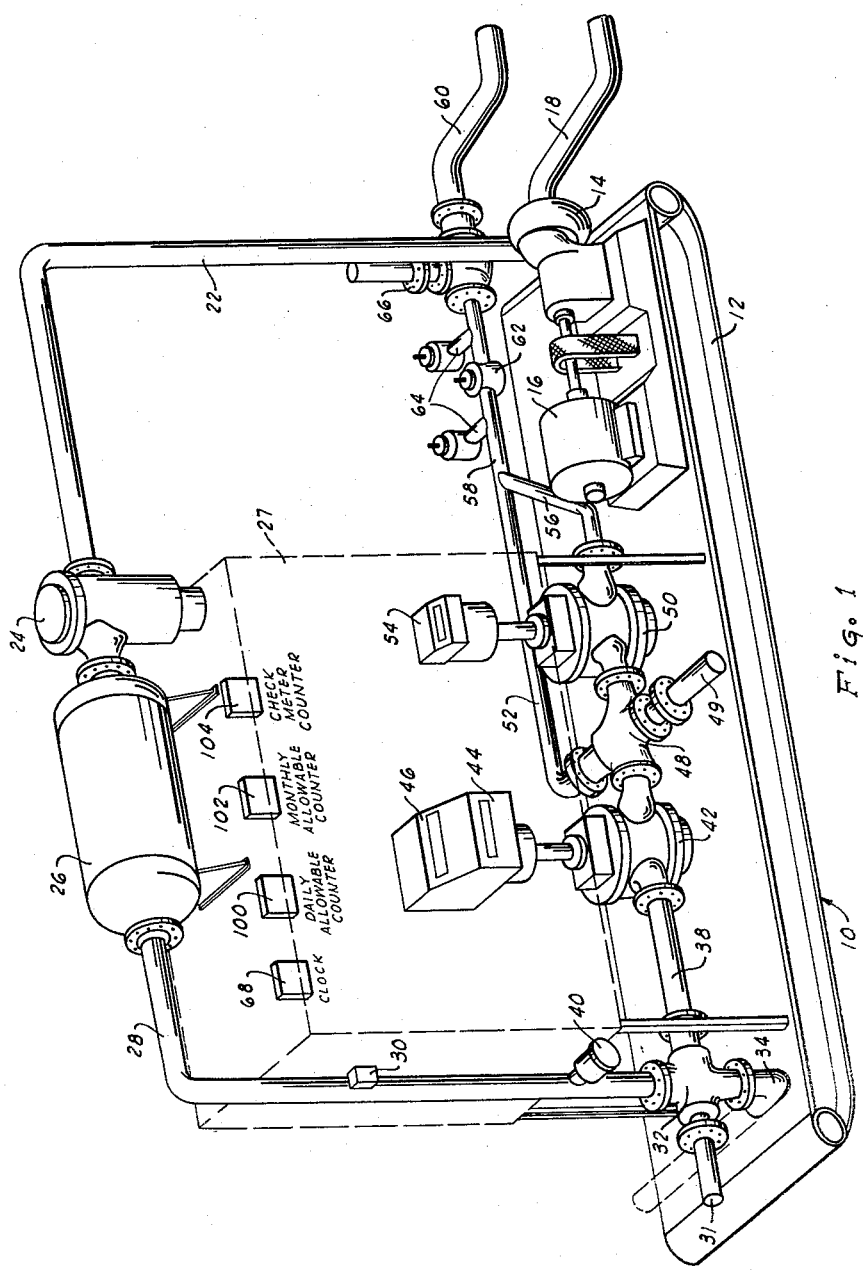
Figure 1 is a perspective view of a custody transfer system constructed in accordance with this invention, except for the electrical circuits and contols interconnecting the various components of the system.

Referring to the drawings in detail, and particularly Figure 1, reference character 10 generally designates a custody transfer system constructed in accordance with this invention. The system 10 may be conveniently mounted on a supporting platform 12 which is desirably in the form of a skid to facilitate the assembly of the system at a manufacturing plant and the transportation and positioning of the system as a complete unit in the field at the point of use. The system 10 includes a suitable pump 14 driven by a motor 16 having an electrical motor controller, as will be more fully hereinafter set forth. The inlet of the pump 14 is suitably connected to a pipeline 18 extending from conventional surge or storage tanks (not shown) on the producing lease, such that all of the oil produced by a particular lease will be fed through the line 18. It may also be noted that it is desirable that surge or storage tanks on the lease have a sufficient capacity to store at least one day's allowable for the lease, such that a full day's allowable may be transferred through the system 10 in a continuous operation each day. However, any size of surge or storage tank may be used on the lease and the system 10 will function to measure the oil, as will be more fully hereinafter set forth.

The outlet of the pump 14 is connected to a pipe 22 extending vertically from the pump 14 and then horizontally to the inlet of a strainer 24. The strainer 24 may be of any desired construction which will filter out at least large solid particles, such as rocks, from the crude oil transferred by the pump 14. The clean oil from the strainer 24 is transferred through a gas eliminator 26 to separate the free gas from the crude oil. Both the strainer 24 and gas eliminator 26 are of conventional construction well known to the art, and each may be supported on an instrument housing 27 which is in turn supported on the skid 12. The housing 27 is shown in dashed lines in Figure 1 to illustrate other details of construction.

The oil discharging from the gas eliminator 26 is fed through another pipe 28 back downwardly toward the skid 12. A suitable basic sediment and water (BS&W) monitor 30 is interposed in the pipe 28 to continuously test the crude oil for the percentage of BS&W. The monitor 30 is connected by a suitable circuit (not shown) to the operator 31 of a three-way valve 32 at the lower end of the pipe 28 to circulate the crude oil through a treater (not shown) when the BS&W content exceeds a predetermined minimum, in a manner well known in the art. When the BS&W content is excessive, the crude oil is diverted through the outlet 34 of the valve 32 to the treater. In the event the BS&W content is acceptable, the crude oil is valved directly from the pipe 28 to a pipe 38 extending horizontally over the skid 12. It is also desirable that a suitable sampling device 40 be interposed in the pipe 28 to periodically obtain samples of the crude oil during the transfer of each day's allowable through the system 10. The sampler 40 may be easily operated by the present control system, as will be more fully hereinafter set forth.

The crude oil which has met the desired minimum quality standards is fed through the pipe 38 to a positive displacement, temperature compensated, production meter 42. As will be apparent, the meter 42 will measure all of the oil transferred through the system 10 and the measurement determined by the meter 42 may be read off of a visual counter 44 in the usual manner to indicate the total barrels of oil transferred through the meter. It is also desirable that the meter 42 have a ticket printer 46 combined with the counter 44 in order that the producing and pipeline companies may have a written record of the amount of oil transferred through the system 10 during any given period of time.

Oil measured by the production meter 42 is then transferred through a three-way valve 48 having an electrically controlled operator 49, as will be more fully hereinafter set forth. The valve 48 will either direct the oil through a check meter 50 or through a by-pass line 52 around the check meter 50. The check meter 50 is also preferably of the temperature compensated and positive displacement type and is provided with a conventional visual counter 54 in the usual manner. The oil directed through the meter 50 is fed through a line 56 which is connected back into the by-pass line 52 down stream of the meter 50 and joined with the by-pass 52 into a line 58. The line 58 is in turn connected to an outlet line 60 leading to the gathering system of the receiving pipeline company. If desired, a hand operated valve 62 may be interposed in the line 58 between a pair of by-pass lines 64. The lines 64 may lead to and from a suitable calibrated prover tank (not shown) for periodically proving either or both of the meters 42 and 50 in a manner well known to the art. The construction and/or use of the prover tank forms no part of the present invention and will therefore not be described in detail herein. Normally, the valve 62 will be open to transfer oil directly from the lines 56 and 52 to the discharge line 60. It is also desirable to interpose a back pressure valve 66 in the line 58 to maintain a constant pressure on the meters for maximum meter accuracy. Also, by maintaining a pressure greater than stock or surge tank pressure, the oil is stable and solution gas is kept in solution. The valve 66 also stops flow through the system when the pump 14 stops.

Figure 2:
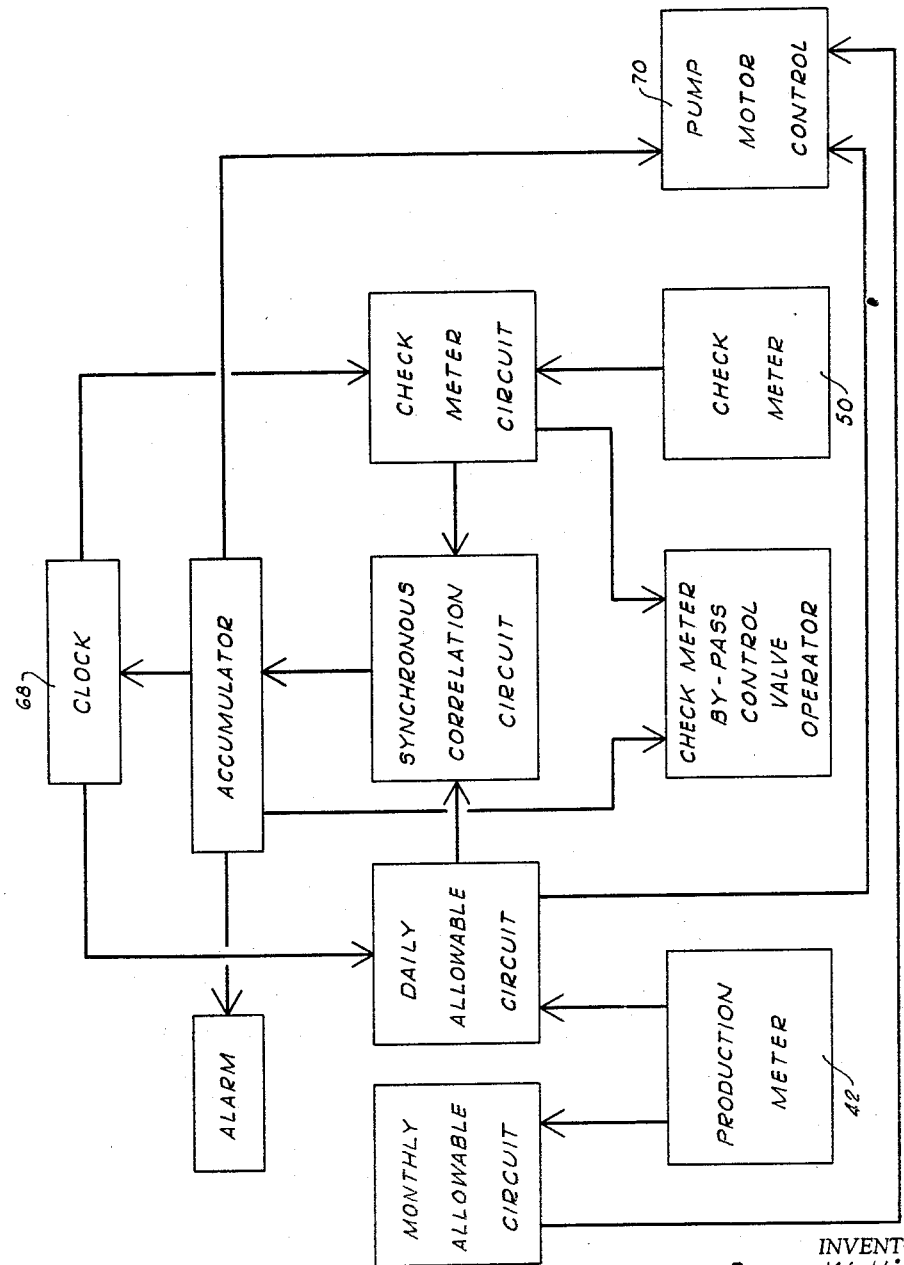
Figure 2 is a block diagram of the major components and divisions of a system constructed in accordance with the present invention to illustrate the general operation of the system.

The basic steps involved in the operation of a system constructed in accordance with this invention is best illustrated by reference to both Figures 1 and 2. At a predetermined time each day, say at 8 a.m., a clock 68 energizes a daily allowable circuit which in turn energizes the control 70 for the pump motor 16. The pump 14 will then be placed in operation to pump oil from the lease through the inlet line 18 and through the pipe 22. The pumped oil flows through the strainer 24 and gas eliminator 26 for removal of solids and free gas from the crude oil as previously described. The pumped crude oil then flows on downwardly through the pipe 28 and the valve 32 through the pipe 38, providing the BS&W content of the crude oil is below a prescribed maximum. The oil forced through the pipe 38 is, of course, directed through the production meter 42 to provide a normal measurement of the quantity of oil pumped through the system 10. The production meter 42 feeds information to both a daily allowable circuit and a monthly allowable circuit, as shown in Figure 2, as well as to the visual counter 44 and ticket printer 46 illustrated in Figure 1. Oil discharging from the production meter 42 is controlled by the three-way valve 48 for flow either through the check meter 50 or the by-pass line 52.

At a predetermined time, which may be substantially simultaneously with the energizing of the daily allowable circuit, the clock 68 energizes a portion of the check meter circuit to in turn switch the three way valve 48 to such a position that the oil discharging from the production meter 42 is directed through the check meter 50. However, it is preferred that the counting portion (as will be described) of the check meter circuit not be energized upon the initial direction of oil through the check meter, in order that the check meter 50 will have sufficient time to warm up and provide an accurate measurement of the oil flow therethrough before the check run is started. The oil passing either through the check meter 50 or the by-pass 52 is directed into the line 58 for discharge through the line 60 to the receiving pipeline. The back pressure valve 66 will, of course, be opened when the pump 14 is started to provide a free passage of oil therethrough.

After the check meter 50 has reached operating temperature, the clock 68 energizes the counting portion of the check meter circuit, such that the measurements indicated by the check meter 40 will then be transmitted to the remote check meter circuit, as well as the visual counter 54 mounted directly above the check meter.

The daily allowable circuit and the check meter circuit both record the measurements of their respective meters, and also generate electrical signals having a variable indicative of the rate of oil flow as measured by the respective meters. Each signal may be a pulse type signal generated when the respective meter indicates that a specific volume of oil has flowed through the respective meter, such as a barrel or a fraction of a barrel. In any event, each signal should have a variable representing the passage of a specific volume through the respective meter, which volume is substantially less than the total volume of oil required to be passed through the meters for an adequate check of the differences in the readings of the two meters. For example, if the meters require the measurement of about 200 barrels to provide an adequate check of the differences in the measurements of the meters, both the daily allowable circuit and the check meter circuit should generate a pulse when the respective meter indicates the passage of about one barrel or less therethrough.

The pulses generated by the daily allowable circuit and the check meter circuit are fed to a suitable correlation circuit for determining the synchronization of the pulses generated by the two circuits. If the measurements of the production meter 42 and the check meter 50 are precisely uniform, the pulses generated by their respective circuits will be either continuously synchronized or continuously unsynchronized. In either of these events, the correlation circuit will take no action. However, if the production meter 42 is out of calibration, it will indicate a greater or less flow than the check meter 50 and the pulses generated by the daily allowable circuit will be slightly faster or slightly slower than the generation of pulses by the check meter circuit. In this last event, the pulses generated by the two circuits will provide alternating series of synchronous and non-synchronous pulses.

The correlation circuit operates (Figure 2) to feed a third signal to a suitable accumulator each time the pulses from the daily allowable circuit and the check meter circuit are synchronized. Thus, during any specific check run, the accumulator will receive at least one signal from the correlation circuit if the production meter 42 is out of calibration, and the number of signals received by the accumulator during a run will indicate the degree of difference in the readings of the production and check meters.

The accumulator functions to energize an alarm of any suitable type to visually or audibly notify the operator of the system of the degree of difference in the readings of the production and check meters. I prefer that the alarm be so constructed that different types of warning signals are given as the difference in the readings of the two meters increases. The accumulator also functions to operate the check meter by-pass control valve circuit and the control 70 of the pump motor when the difference in the readings in the production and check meters exceeds a predetermined maximum. Thus, the pump 14 will be stopped and the check meter by-pass valve 48 will be operated to divert the flow of oil through the by-pass 52 in the event the difference in the measurements of the production and check meters exceeds a predetermined maximum. Upon the stopping of the pump 14, the accumulator also functions to operate an alarm, such that the operator will be advised of the difference of measurement of the two meters and advised of the stoppage of the system, whereby corrective action may be taken before more oil is pumped to the receiving pipeline.

In the event the difference in the measurement of the two meters does not exceed the predetermined maximum during the passage of a predetermined total volume through the check meter 50, the check meter circuit will, by having been preset, actuate the check meter by-pass control valve circuit and actuate the three-way valve 48 to by-pass the check meter 50 at the end of the desired check run. Thereafter, oil pumped through the production meter 42 will be diverted through the by-pass 52 on its way to the discharge line 60. The production meter 42 will, of course, continue to operate the daily allowable circuit, the monthly allowable circuit, and the visual counter 44 mounted above the meter.

The daily allowable circuit is preset to provide a continuous passage through the system of a volume of oil equal to one day's allowable of oil from the particular lease on which the system is used. When this predetermined volume has been indicated by the production meter 42, the daily allowable circuit operates the control 70 of the pump motor 16 to stop the pump 14 and close down the system 10. The pump 14 is not again placed in operation until the next day's run, when the pump is started by the clock 68 as previously described. Also, the monthly allowable circuit is preset for the volume of oil which may be produced by the patricular lease during a month's time. Therefore, when such monthly allowable has been reached, the monthly allowable circuit operates the control 70 of the motor 16 to stop the pump 14 and prevent further transfer of oil from the lease. The monthly allowable circuit is preferably constructed such that the pump 14 cannot again be placed in operation until the monthly allowable circuit is manually re-set, in order that the producing company will be advised when the month's allowable of oil has been taken from the respective lease.

At any time during use of the present system, either the producing company or the pipeline company may be advised as to the amount of oil which has been taken from the lease by operating the ticket printer 46. The ticket printer 46 may be of any desired type, such as the type which will produce a printed ticket advising the amount of oil which has been passed through the system 10 since a re-setting of the counter 44, as well as the volume of oil which has been passed through the system 10 since the last time a ticket was taken from the printer 46. A preferred use of the ticket printer 46 is by the pipeline company, such that the pipeline company may have a printed record of the amount of oil passed through the system 10 between visits by a representative of the pipeline company.

In summarizing the general operation of the present system, it will be noted that, each day, the system will transfer a volume of oil from a lease to a pipeline company which is equal to the amount of oil which may be legally or desirably produced by the particular lease in a 24 hour period. Also, the system automatically provides a transfer of oil from the lease to the pipeline company during a month's time which is equal to the desired or legal monthly allowable production for the particular lease. These automatic transfers of predetermined volumes of oil from the lease to the receiving pipeline company will be performed automatically, as long as the production meter 42 does not have an error above a predetermined maximum.

Each day the system 10 is in operation, a predetermined volume of oil is automaticaly directed through a check meter to check the operation of the production meter 42, providing the production meter is operating properly. If the production meter goes off calibration by a predetermined amount, the measurement indicated by the production meter will be different from the measurement indicated by the check meter during the check run. The fact that measurements by the two meters differ is indicated by a series of visual or audible alarms to advise the operator of the system that the production meter 42 is in need of calibration. If the difference between the two readings exceeds a predetermined maximum, the entire system is automatically stopped and the operator is so notified in order that proper corrective action may be taken. The comparison of the measurements made by the two meters is accomplished automatically by electrical circuits in order that the most accurate comparison may be made and no appreciable additional load will be imposed on either of the meters. The comparison is preferably accomplished by the generation of time-spaced pulse type signals by the respective meters as the respective meters indicate the flow of rather minute volumes therethrough. The pulse type signals may be easily correlated for their time phase relation, such that the difference in the measurements indicated by the two meters may be accumulated and used to operate the alarms, as well as stop the operation of the system when this difference exceeds a predetermined maximum.

Figure 6:
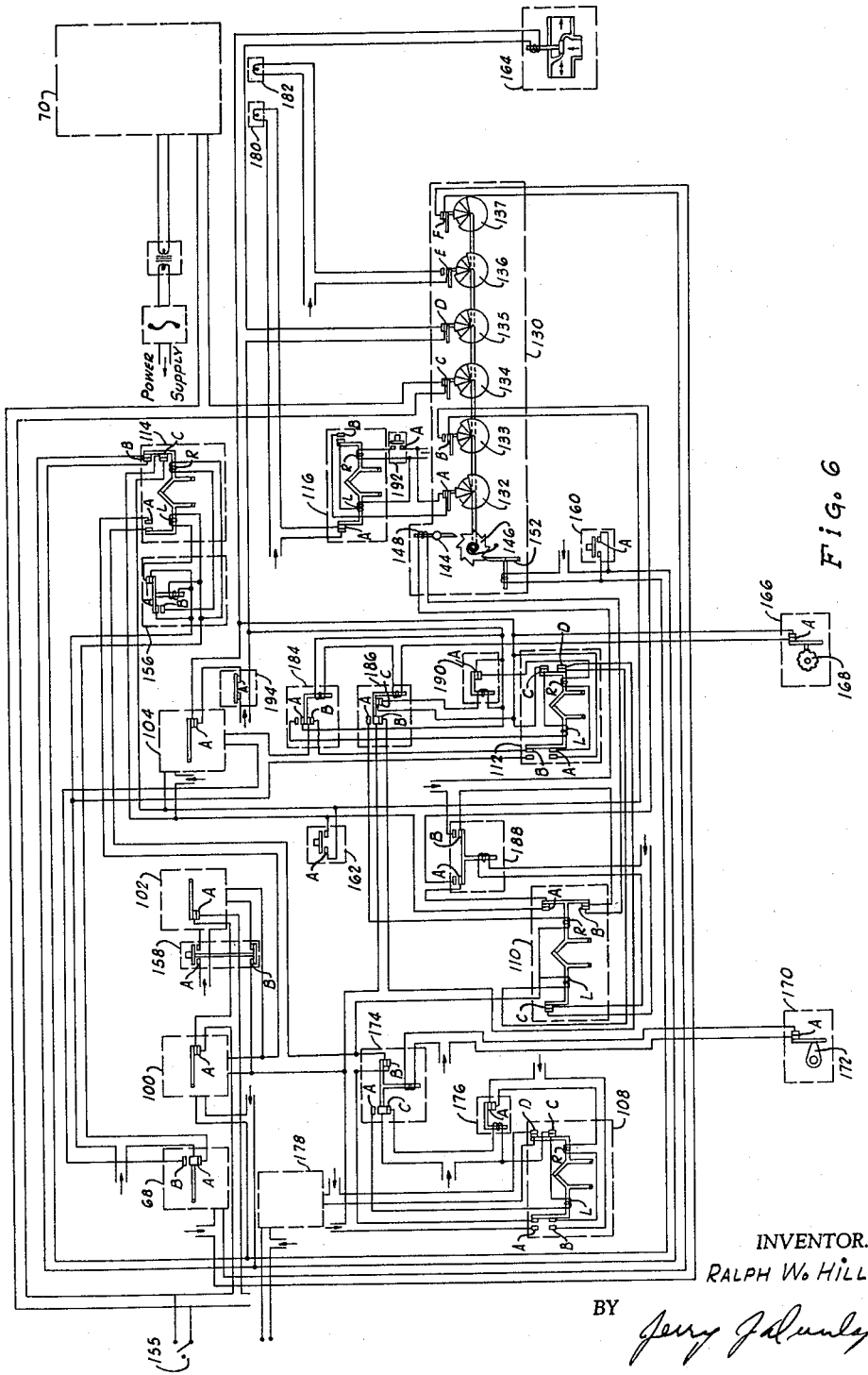
Figure 6 is a wiring diagram of the preferred embodiment of this invention.

In the preferred form of this invention, as illustrated in Figure 1 and by the wiring diagram of Figure 6, I use three remote counters 100, 102 and 104 for, among other things, recording daily, monthly and check count readings, respectively. As illustrated in Figure 3, each of these remote counters has a switch arm 106 which is operated by the mechanical counting mechanism of the respective counter, such that the respective switch arm is raised when the respective counter has accumulated a predetermined reading. In other words, each of these counters may be preset for a predetermined reading, such that when the predetermined reading is reached, the respective switch arm 106 will be raised to break the respective contacts A and open a "counted-out" control circuit, for purposes which will be hereinafter set forth. Each of the counters 100, 102 and 104 is provided with an electrical re-set circuit, as indicated in Figure 3, such that the respective counter may be returned to zero when the re-set leads are energized. Also, each of these remote counters is of the electrical type and responsive to an electrical pulse fed through the counting feed lines for advancing the respective counter one unit of measure. For example, when the remote counters provide a reading in barrels, each counter is advanced to read an additional barrel whenever a signal is transmitted to the counter through the electrical counting feed leads. The manner in which the remote counters 100, 102 and 104 are used in the system will be described below.

The preferred embodiment of this invention also makes use of a plurality of latching relays, 108 through 116, as illustrated in detail in Figure 4. Each of these latching relays comprises a pair of vertically extending arms 118 and 120 pivoted at their lower ends for swinging movement in a vertical plane. The arms 118 and 120 are loaded by a spring 122 which tends to pivot the arms toward one another. Stops 124 are provided to limit the inward movement of the arms 118 and 120.

Each of the arms 118 and 120 is bent inwardly at its upper end toward the other arm, such that the extreme upper ends of the arms make sliding contact with one another and prevent simultaneous movement of the arms in the same direction. For example, the arms 118 and 120 are shown in their left-hand positions in Figure 4. When the arms are moved to their right hand positions, the arm 120 must first pivot clockwise a predetermined distance before the arm 118 can be moved. When the arm 120 has been moved from underneath the upper end of the arm 118, the spring 122 will snap the arm 118 clockwise against its respective stop 124, such that the upper end of the arm 118 will then be underneath the upper end of the arm 120. When the arms are moved to the left, the arm 118 is moved first and then the arm 120 is moved in a sequence which is the reverse of the right hand movement of the arms. Thus, when each of the latching relays is actuated, one of the arms thereof is moved before the other arm to provide a time delay between the operation of switches carried by the opposite arms. For example, the movable contacts (A and B) of a pair of switches may be carried on the outer end of a shaft 126 extending outwardly from the arm 118, and the movable contacts (C and D) of another pair of switches may be carried on the outer end of a shaft 128 extending outwardly from the arm 120. In this example, there is always a time delay between operation of the A and B contacts and operation of the C and D contacts.

Each of the latching relays is actuated by a left-hand coil designated L and a right-hand coil designated R. When the L coil is energized the arms 118 and 120 will pivot counter-clockwise, or to the left, and when the R coil is energized the arms 118 and 120 will pivot clockwise, or to the right. When neither of the coils L or R are energized, the arms 118 and 120 will stay in their respective positions with one of the arms being in contact with its respective stop 124. The time delay in the movement of the arms 118 and 120 is used to advantage in the preferred system, as will be more fully hereinafter set forth.

The accumulator, the general function of which was described above, is in the form of a stepping switch 130 in the preferred embodiment of this invention. The stepping switch 130 is shown in detail in Figure 5 and comprises six cams 132 through 137 rigidly mounted on a common shaft 138. The shaft 138 is suitably supported for rotation to simultaneously vary the positions of the cams 132 through 137. Each of the cams 132 through 137 has four segments thereon designated by the letters W, X, Y and Z, with the respective segments of the cams being axially aligned, such that when the W segment on the cam 132 is extended vertically, the W segments on the remaining cams will also be extended vertically, etc. For purposes of this description, the cams may all be considered either in their W, X, Y or Z positions when the respective segments are extended vertically above the shaft 138. The radii of the segments on the various cams are, however, varied to operate switch arms 140 riding on the respective cams. The switch arms 140 are spring-loaded to open their respective contacts when the arms are moved into a depression of the respective cams. These switch contacts have been designated by letters A through F to correspond with the cams 132 through 137, for convenience in the description of this invention.

The cam 132 is utilized to actuate an alarm circuit, as will be hereinafter set forth, and is shaped such that the W, X, and Z segments are of the same radius, whereas the Y segment is of an increased radius to close the respective A contacts when the Y segment is extended vertically as illustrated in Figure 5. The cam 133 is used in the control of the re-set of the remote check meter counter 104 as will be described and for this purpose has its X, Y, and Z segments formed with a smaller radius than the segment W. It will be apparent that when the respective switch arm 140 of the cam 133 rides on the segments X, Y, and Z, the B contacts will be open; whereas when the switch arm 140 is riding on the segment W, the B contacts will be closed.

The cam 134 is used in the operation of the controller 70 for the pump of the system and has its W, X, and Y segments of increased radius, with its Z segment of decreased radius to open the C contacts when the Z segment is turned vertically. The cam 135 is used in the control of the three-way check meter by-pass control valve 48, and for this purpose has its segments shaped in the same manner as the segments of the cam 134 previously described. When the Z segment of the cam 135 is turned upwardly, the D contacts will be open; whereas the D contacts will be closed when either of the segments W, X, or Y are turned upwardly.

The cam 136 is used to actuate another alarm circuit as will be more fully hereinafter set forth, and for this purpose has its Z segment formed with a larger radius than the remaining segments. When the Z segment is turned upwardly, the E contacts will close; whereas when any of the other segments (W, X, or Y) are turned upwardly, the E contacts will be open.

The cam 137 is used to stop the clock 68 (shown in Figure 6) when the difference in the measurements of the production and check meters exceeds a predetermined maximum, as will be more fully hereinafter set forth. As will be observed, the Z segment of the cam 137 is formed with a shorter radius than the remaining segments to open the F contacts only when the Z segment is turned upwardly. At all other times the F contacts will be closed.

The various positions of the cams 132 through 137 are controlled by a solenoid-actuated pawl 144 engaging a ratchet wheel 146 rigidly mounted on one end of the shaft 138. As noted in the drawing, the pawl 144 is normally in a down position in engagement with the ratchet wheel 146. Upon energizing the solenoid 148 of the pawl, the pawl is raised above the ratchet wheel 146. When the solenoid 148 is again de-energized, the pawl 144 is forced downwardly by its own weight, or an added weight, to engage another lug on the ratchet wheel 146 and index the ratchet wheel in a clockwise direction as viewed in Figure 5. The ratchet wheel 146 is constantly urged in a counter-clockwise direction by a suitable coil spring 150, but is normally held against counter-clockwise rotation by a lower pawl 152. The lower pawl 152 is also provided with a solenoid 154 for retracting the pawl 152 from the wheel 146 and resetting the cams 132—137 when the solenoid 154 is energized. Furthermore, the lower pawl 152 is spring-loaded (not shown) to return into engagement with a lug of the wheel 146 when the solenoid 154 is de-energized.

In the following description of the preferred embodiment of this invention the letters used to designate the contacts, switches and coils of the various components of the system will be used as suffixes to the reference number for the respective component, although the various contacts, switches and coils illustrated in the drawings are designated only by letters, to correlate the description with the drawings and eliminate confusion as to which contacts are being referred to.

The entire electrical system shown in Figure 6 is energized by a suitable power supply tied into the system at various points, as indicated by the small arrows. It may also be noted that the switch 155 is closed as long as an adequate supply of oil is available to the inlet pipeline 18 (Figure 1). The switch 155 may be operated manually, or by any desired control system connected to the lease surge or storage tanks.

*Circuit for starting daily run and test*

The clock 68, previously referred to in the general description of this invention, is provided with a time-operated switch arm for alternately closing the contacts 68A and 68B, as shown in Figure 6. At a predetermined time each day, clock 68, opens normally closed switch 68B, breaking the power supply to the counting circuit of check meter counter 104. Simultaneously, switch 68A closes, completing a power circuit which enrgizes 3.0 second time delay relay 156 and coil 114L of latching relay 114. (Switch 156A is normally closed, and remains closed for 3.0 seconds after 156 is energized.)

Energizing 114L moves the arms of relay 114 to the left hand position, whereupon:

(a) Contacts 114A open, breaking the counting circuit to the remote daily allowable counter 100,
(b) Contacts 114B close, completing a power circuit which holds counter 100 and the stepping switch 130 in reset, and
(c) Contacts 114C close, completing a power circuit which holds the remote check meter counter 104 in reset.

Due to the mechanical design of latching relay 114, contacts 114A open before contacts 114B and 114C close. This is important, as the counters 100 and 104 can be damaged if they are counting while being reset.

After 3.0 seconds, time delay relay 156 moves downward, whereupon:

(a) Switch 156A opens, breaking the power circuit to coil 114L,
(b) Switch 156B closes, completing a power circuit to coil 114R, and moving the arms of relay 114 to the right hand position, whereupon:

(1) Switch 114B opens, breaking the power circuit which held counter 100 and stepping switch 130 in reset,
 (2) Switch 114C opens, breaking the power circuit which held counter 104 in reset, and
 (3) Switch 114A closes, completing the counting circuit to counter 100.

Due to the mechanical design of latching relay 114, as previously noted, switches 114B and 114C open before 114A closes.

Daily allowable counter switch 100A was open prior to the start of the day's run, as the counter was in the "counted out" position. With reset completed 3.0 seconds after clock switch 68A closed, the counter is now in the counting position and counter switch 100A is closed. This completes a circuit which energized motor controller 70, starting the pump motor and oil flow, provided:

(a) Monthly allowable counter switch 102A is closed, which obtains until the count reaches the preset monthly allowable. If counter 102 has reached the pre-set number of allowable barrels of oil, the pump will not start until counter 102 is manually reset by push button 158, and
(b) Stepping switch 130 is not in the "Z" position. Stepping switch 130 steps to the "Z" position when the previous test indicated the two meters to be out of agreement by 0.1% or more. With switch 130 in the "Z" position, 130C is open, breaking the circuit to controller 70. To close 130C, stepping switch 130 must be manually reset by push button 160 to the home or "W" position.

Check meter counter switch 104A was open prior to the start of the day's run, as the counter reaches the "counted out" position each day, provided: Stepping switch 130 is not in the "Z" position. Switch 130 steps to the "Z" position when the previous test indicated the two meters to be out of agreement by 0.1% or more. Switch 130 steps to the "Z" position immediately when the difference between the meter readings is 0.2 barrels during a test, regardless of whether or not counter 104 has reached the predetermined count. Stepping switch 130 must be manually reset by push button 160 when in the "Z" position, and counter 104 must be manually reset by push button 162 at that time, to start normal operation after the malfunction causing the 0.1% meter disagreement is corrected.

Whether or not check meter counter 104 was in the "counted out" position, reset of counter 104 is completed 3.0 seconds after clock switch 68A is closed, as previously described. Counter 104 is then in the "counting" position and switch 104A is closed. This completes a power circuit which energizes a control for by-pass control valve 48, which may be in the form of a solenoid valve 164, which then furnishes pilot gas to the check meter three-way valve operator 49, putting the two meters in series during the test provided: If stepping switch 130 was in the "Z" position, that it was reset to the home or "W" position, closing switch 130D.

Thus, 3.0 seconds after clock switch 68A closes, oil is pumped through the production and check meters in series. 15 minutes later, clock switch 68A opens and switch 68B closes, whereupon:

(a) Coil 114R is de-energized as switch 68A breaks its power circuit. The arms of relay 114 do not move, and
(b) Time delay relay 156 is de-energized, as switch 68A breaks its power circuit, whereupon:

(1) Switch 156B opens, breaking the power circuit to coil 114R (simultaneously broken by switch 68A), and
(2) Switch 156A closes, partially completing the power circuit to coil 114L (the circuit has been broken by switch 68A).

The counting circuit to counter 104 is energized as clock switch 68B closes, so check counter 104 is ready to receive pulses from a check meter switch 166A. The switch 166A is actuated by a cam 168 geared (not shown) to the check meter 50, and the cam 168 has ten lobes thereon to close the switch 166A as the check meter 50 measures each 1/10 of a barrel of oil, as will be more fully hereinafter set forth.

The purpose of the 15 minute delay before the check meter counter 104 receives counting pulses is to permit sufficient oil flow through the check meter 50 so that the check meter and its temperature compensator will come to the same temperature as the production meter 42.

*Circuit for counting production meter pulses on daily and monthly allowable counters*

Daily and monthly allowable predetermined counters 100 and 102 indicate each barrel of oil flowing through the production meter 42. Production meter switch 170 closes once for each barrel of oil measured by the meter and remains closed for approximately 15° rotation of the meter rotor. The switch 170 is actuated by a cam 172 geared to the production meter for rotation uniformly with the production meter rotor. When production meter switch 170A is open, the arms of latching relay 108 are in the left hand position, as described below. When switch 170A closes, the solenoid of a relay 174 is energized, whereupon:

(a) Switch 174A opens, breaking a power circuit to coil 108L (switch 108C in that circuit is already open).
(b) Switch 174B closes, completing a power circuit to counters 100 and 102, moving the counters forward one digit. (Switches 108A and 114A in that circuit are closed.).
(c) Switch 174C closes, energizing a time delay relay 176. 0.25 second later, switch 176A closes, energizing coil 108R of latching relay 108. Switch 108B in that circuit is closed thereby moving the relay arms to the right, whereupon (1) Switch 108A opens, breaking the counting circuit to counters 100 and 102,
(2) Switch 108B opens, breaking the circuit which energized coil 108R,
(3) Switch 108C closes, partially completing a power circuit to coil 108L (switch 174A in that circuit is open), and
(4) Switch 108D closes, energizing a stepping relay 178. When switch 178 reaches a predetermined count, a circuit (not shown) is completed which energizes the sampler 40 (Figure 1) to remove a sample of the oil from the line 28 and store it in a sample vessel (not shown).

When production meter switch 170A opens, the solenoid of relay 174 is de-energized, whereupon: Switch 174A closes, energizing coil 108L of latching relay 108, thereby moving the relay arms to the left, whereupon:

(a) Switch 108A closes, partially completing the counting circuit to counters 100 and 102 (switch 174B of that circuit is open).
(b) Switch 108B closes, partially completing the circuit to coil 108R (switch 176A of that circuit is also open, as switch 174C is open and the solenoid of relay 176 is de-energized).
(c) Switch 108C opens, breaking the circuit to coil 108L, and
(d) Switch 108D opens, de-energizing stepping relay 178, whereupon it is in position for the next pulse.

Thus, counters 100 and 102 receive one 0.25 second pulse for each revolution of meter cam 172 (each barrel of oil). Omitted in the above description is the fact that when switch 108A closes, a circuit to latching relay 110 is completed. This is a part of the correlation circuit which is described below in connection with the check meter circuit.

*Check meter circuit*

Predetermined check meter counter 104 is pre-set at 2000, and the daily test ends when the 2000 count, representing 200 barrels (one count for each 1/10 barrel) is reached. If production meter cam 172 rotates faster than check meter cam 168, or vice versa, representing a difference in measurement as indicated by the two meters, there will be a relative rotation of cams 172 and 168. At some time during this relative rotation, switches 170A and 166A will close simultaneously. A number of possible situations ensue, depending on the magnitude of disagreement between the production and check meters.

*Situation I.*—If the count on counter 104 reaches 2000 before switches 170A and 166A close simultaneously, the difference between the meters is less than one count in 2000 (0.05%), so the current test ends and the check meter 50 is again by-passed until the next test period.

If switches 170A and 166A close simultaneously before the count on counter 104 reaches 2000, counter 104 resets to zero. This is necessary as switches 170A and 166A may have been near simultaneous closure when the test started, which would result in a false indication that the meters disagreed by one count in 2000. Several situations then ensue:

*Situation II.*—If after counter 104 resets to zero, counter 104 reaches 2000 before switches 170A and 166A close simultaneously, the difference between the meters is less than one count in 2000, so the current test ends and the check meter 50 is again by-passed until the next period.

If after counter 104 resets to zero, switches 170A and 166A again close simultaneously before counter 104 reaches 2000, the indication is that the check meter 50 has gained or lost one count with respect to the production meter, representing a difference of a minimum of one count in 2000, or 0.05% minimum.

At that time green alarm light 180 is energized but the test continues. Two possible situations then ensue:

*Situation III.*—If counter 104 reaches 2000 before switches 170A and 166A close simultaneously for the second time since counter 104 was reset, the current test ends and the check meter is again by-passed until the next test period, but the green alarm light remains energized as a warning that the production meter requires proving.

*Situation IV.*—If switches 170A and 166A close simultaneously for a second time after the counter was reset to zero, and before counter 104 reaches 2000, the indication is that the check meter has gained or lost 2 counts with respect to the production meter, representing a difference of a minimum of 2 counts in 2000, or 0.1%. At that time red alarm light 182 is energized and motor controller 70 is de-energized, shutting down the pump. A back pressure valve 66 (Figure 1) downstream from the meters then closes, and oil flow stops until the cause of mismeasurement is corrected and the unit is manually restarted.

When check meter switch 166A closes, the coils of relays 184 and 186 are energized, whereupon:

(a) Switch 184A opens, breaking the circuit which had previously energized coil 112L and moved the arms of latching relay 112 to the present left hand position, (b) Switch 184B closes, completing the counting circuit to check meter 104, moving the counter wheel one digit (clock switch 68B in that circuit is closed, as previously explained. Switch 112B in that circuit is also closed, as the arms of latching relay 112 are in the left hand position), (c) Switch 186A opens, breaking the circuit which had previously energized coil 110R and moved the arms of latching relay 110 to the present right hand position, (d) Switch 186B closes, energizing coil 110L and moving the arms of latching relay 110 to the left hand position, provided 108A, 174B and 112D are closed (switch 108A and 174B are simultaneously closed for 0.25 second once each revolution of meter cam 172, as explained previously). Thus, the arms of latching relay 110 move in the left hand position only if and when 166A is closed during the 0.25 second per barrel or per revolution that switches 108A and 174R are simultaneously in the closed position. As later described, switch 112D closed 0.25 second after switch 186B closes. If the count on check meter 104 reaches 2000 before the arms of latching relay 110 move to the left hand position as described above (Situation 1), switch 104A opens, breaking the power circuit to relays 184 186 and solenoid valve 164, whereupon switch 184B opens and pulses to counter 104 cease. Also, valve 164 vents instrument gas from the three-way valve 48 between the production and check meters, and the check meter is again by-passed until the next test period. If relay 110 does move to the left hand position before 2000 pulses are counted on 104 (Situation II, III, and IV); switch 110A closes, completing a circuit which resets check counter 104, provided switches 130B and 112D are in the closed position. (Contacts 130B are closed when switch 130 is in the "W" position. Since clock 68 reset switch 130 at the beginning of the current test, switch 130 is presently in the reset or "W" position. Normally closed time delay relay contacts 188A in the circuit are in the closed position for 3.0 seconds, providing sufficient time for counter 104 to reset, (e) Switch 110B closes, completing a circuit which indexes stepping switch 130 to the "X" position. (Normally closed time delay relay contacts 188B are in the closed position for 3.0 seconds), (f) Switch 110C closes, energizing 3.0 seconds normally closed time delay relay 188, opening contacts 188A and 188B after 3.0 seconds has elapsed. Thus, check meter counter 104 is reset by a 3.0 second pulse, and stepping switch 130 is indexed by a 3.0 second pulse. (Switch 130 does not actually index until the end of the 3.0 second delay, as the latching mechanism 144 is cocked when energized, and rotates the cams 132—137 when deenergized as previously explained.)

Switch 186C closes simultaneously with 186B, completing a circuit which energizes 0.25 second normally open time delay relay 190. 0.25 second later, contacts 190A close, completing a circuit which energizes coil 112R, moving the arms of latching relay 112 to the right hand position (switch 112A in that circuit is closed), whereupon:

(a) Switch 112A opens, breaking the circuit which energized coil 112R, (b) Switch 112B opens, breaking the counting circuit to check counter 104, and (c) Switch 112C closes, partially completing a circuit which energizes coil 112L (switch 184A in that circuit is open), (d) Switch 112D closes, completing a circuit which resets counter 104, as previously described.

Thus, closure of check meter switch 166A results in a 0.25 second pulse to check meter counter 104, indexing the counter one digit.

When check meter switch 166A opens, the coils of relays 184 and 186 are deenergized, whereupon:

(a) Switch 184A closes, completing a circuit which energizes coil 112L moving the arms of latching relay 112 to the left hand position (switch 112C in that circuit is closed), whereupon:
  (1) Switch 112A closes, partially completing the circuit to coil 112R (switch 190A of that circuit is open),
  (2) Switch 112B closes, partially completing the counting circuit to check counter 104 (switch 184B of that circuit has simultaneously opened), and
  (3) Switch 112C opens, breaking the circuit which energized coil 112L,
  (4) Switch 112D opens, breaking the circuit which energized coil 110L (switch 186B of that circuit has simultaneously opened).

(b) Switch 184B opens, breaking the counting circuit to check counter 104.

(c) Switch 186A closes, completing a circuit which energizes coil 110R, moving the arms of latching relay 110 to the right hand position, providing switches 108A and 174B are closed. Since switch 166A is open most of the time, latching relay 110 will normally be in the right hand position, and will move to the left hand position only when switch 170A transmits a 0.25 second pulse during the time when switch 166A is closed. It is an important and necessary feature that stepping switch 130 will be indexed only once even if this condition obtains several times in succession. In other words, the two meters can pulse simultaneously for a number of barrels, yet the first time they pulse simultaneously is the only instance that results in actuation of stepping switch 130. It will be understood that "simultaneous" pulses means that when the switch 170A is closed by the cam 172, the switch 166A is closed by one of the lobes of the cam 168. In other words, when the pulse produced by the switch 170A coincides with one of the pulses produced by the switch 166A, the pulses from the two meters may be considered "simultaneous," or in time-phase relation. Once such a series of simultaneous pulses is broken, latching relay 110 moves again to the right hand position, ready for the next series of simultaneous pulses. With the arms of relay 110 in the right hand position:
  (1) Switch 110A opens, breaking the circuit which which reset counter 104 (switch 188A of that circuit is already open, but closes shortly after switch 110A opens, as described below),
  (2) Switch 110B opens, breaking the circuit which indexed stepping switch 130 (switch 188B of that circuit is already open, but closes shortly after switch 110B opens, as described below),
  (3) Switch 110C opens, breaking the circuit normally closed time delay 188, whereupon:
  (4) Switch 188A closes, partially completing the circuit which reset counter 104 (switch 110A of that circuit just opened),
  (5) Switch 188B closed, partially completing the circuit which indexed stepping switch 130 (switch 110B of that circuit just opened), (switches 188A and 188B close at a slower rate than switches 110A and 110B open, so no momentary circuit closure occurs.)

(d) Switch 186B opens, breaking the circuit to coil 110L, so that each additional 0.25 second pulse which occurs when switches 108A and 174B are simultaneously in the closed position cannot move the arms of latching relay 110 back to the left hand position until that pulse again occurs when switch 186B is closed by closure of switch 166A.

(e) Switch 186C opens, deenergizing normally open 0.25 second time delay relay 190, whereupon: Switch 190A opens, breaking a circuit which energized coil 112R (switch 112A of that circuit is already open).

Counter 104, which has just been reset to zero due to simultaneous pulses from both meters, will again count pulses from switch 166A. If the count reaches 2000 before a second series of simultaneous pulses from the meters occurs (Situation II), switch 104A opens; whereupon the test ends and oil by-passes the check meter until the next test period, as previously described. If a series of simultaneous pulses occurs after the counter 104 has been reset and before the count reaches 2000 (Situation III), stepping switch 130 will again index, to the "Y" position. Counter 104 will not reset, however, as contacts 130B in that circuit will open. In the "Y" position of stepping switch 130, switch 130A will close, completing a circuit which energizes coil 116L and moves the arms of latching relay 116 to the left hand position (the arms of relay 116 are normally in the right hand position with switch 116B closed), whereupon:

(a) Switch 116A closes, completing a circuit which energizes green alarm light 180, and
(b) Switch 116B opens, breaking the circuit which energized coil 116L.

Green alarm light 180 will stay energized until the arms of relay 116 are moved back to the right hand position by manually pressing a push button 192, which completes a circuit which energizes coil 116R. Stepping switch 130 must be reset to the home or "W" position before button 192 is pressed to deenergize green alarm light 180, otherwise energized coil 116L will prevent the arms of relay 116 from moving to the right and breaking contacts 116A in the green light 180 circuit.

If a second series of simultaneous pulses occurs after counter 104 has been reset and before the count reaches 2000 (Situation IV), stepping switch 130 will move to the "Z" position. Counter 104 will not reset as switch 130B in that circuit will be open. In the "Z" position of stepping switch 130:

(a) Contacts 130C open, breaking the circuit which energized motor controller 70, and stopping oil flow as previously described,
(b) Contacts 130D open, breaking the circuit which energized solenoid valve 164, shifting the check meter three-way valve 48 to the bypass position as previously described,
(c) Contacts 130E close, energizing red alarm light 182, and
(d) Contacts 130F open, breaking the circuit which energizes clock 68, stopping the clock to indicate the time the malfunction occurred. With the clock stopped, no further tests can be started as switch 68A will not close until the clock is restarted by manually resetting stepping switch 130.

The unit is now shut down until the operator corrects the malfunction which resulted in the meter disagreement of 2 counts in 2000 or less (check meter counter 104 may not have reached a count of 2000 when the shutdown occurred). After correcting the malfunction, it will be necessary to manually press button 160 to reset stepping switch 130 to the reset or "W" position, and reset the clock for the correct time.

*Daily allowable shutdown*

When the daily allowable, as determined by the setting of predetermined automatic reset counter 100, has been run, switch 100A will open, breaking the circuit to motor controller 70, stopping oil flow as previously described. Clock 68 will reset the daily allowable counter 100 the following day as previously described, whereupon switch 100A will again close.

*Monthly allowable shutdown*

When the monthly allowable, as determined by the setting of predetermined manual reset counter 102, has been run, switch 102A will open, breaking the circuit to motor controller 70, stopping oil flow as previously described. Oil runs are again started by pressing push button 158, whereupon:

(a) Push button switch 158A closes, completing a power circuit to reset 102; and
(b) Switch 158B opens, simultaneously breaking the counting circuit to counter 102 (preventing damage that would result if a counting pulse occurred during reset).

Manual switch 194 is provided to inactivate the check meter circuit, if or when desired. Push button switch 162 is provided to manually reset check meter counter 104 if any unscheduled test is desired.

From the foregoing it will be apparent that the present invention provides a novel method and system for automatically measuring and transferring the custody of crude oil from a lease to a receiving pipeline. The oil transferred is measured by a positive displacement meter, and the meter is automatically and periodically checked by use of a check meter, whereby wear of the check meter will be minimized and the check meter will remain calibrated over an extended period of time. It will also be apparent that the present invention provides a novel method of correlating the measurements of the production and check meters to accurately determine the accuracy of the production meter, and without placing any appreciable loads on the production and check meters.

Changes may be made in the combination and arrangement of parts or elements, as well as steps and procedures heretofore set forth in the specification and shown in the drawings, it being understood that changes may be made in the precise embodiments disclosed without departing from the spirit and scope of the invention as defined in the following claims.

I claim:
1. In a system for the automatic custody transfer of oil from a lease to a receiving pipeline, a production flow meter, a check flow meter, a pump having an electrical control, conduits connecting the meters and the pump in series between the lease and the pipeline, a pulse producing circuit connected to the production meter for producing time-spaced electrical pulses in accordance with the flow of oil from the lease to the pipeline as indicated by the production meter, a pulse producing circuit connected to the check meter for producing time-spaced electrical pulses in accordance with the flow of oil from the lease to the pipeline as indicated by the check meter, and means responsive to synchronized pulses produced by the pulse producing circuits for operating the pump control and stopping the pump when the difference in the measurements of the meters exceeds a pre-determined maximum.

2. A system as defined in claim 1 characterized further in that the production meter is upstream from the check meter, a by-pass conduit extending around the check meter, a control valve in said by-pass having an electrically controlled operator, a counter connected to the check meter pulse producing circuit for adding the measurements of the check meter, and a switch connected to the operator of the control valve and operated by the counter for operating the control valve and by-passing oil around the check meter when a pre-determined volume of oil has been measured by the check meter.

3. A system as defined in claim 2 characterized further in that said counter has an electrical reset circuit, a switch in said reset circuit, and a clock connected to said switch and said by-pass control valve operator for resetting said counter and operating said control valve at a predetermined time each day to direct oil through the check meter and count the measurements of the check meter.

4. A system as defined in claim 2 characterized further to include a daily allowable counter connected to the production meter pulse producing circuit for adding the measurements of the production meter, and electrically connected to the pump control for stopping the pump when a predetermined volume of oil has been measured by the production meter.

5. A system as defined in claim 4 characterized further in that said counter has an electrical reset circuit, and a clock connected to said reset circuit and the pump control for resetting said counter and starting the pump at a predetermined time each day.

6. In a system for the automatic custody transfer of oil from a producing lease to a receiving pipeline, a production flow meter, a cam carried by the production meter and rotated in timed relation to measurements made by the production meter, a check flow meter, a cam carried by the check meter and rotated in timed relation to measurements made by the check meter, a pump having an electrical control, conduits connecting the meters and pump in series between the lease and pipeline, a first electrical circuit, a spring-loaded switch in the first circuit positioned for operation by the production meter cam to produce momentary time-spaced closures of the first circuit in accordance with the measurements of the production meter, a second electrical circuit, a spring-loaded switch in the second circuit positioned for operation by the check meter cam to produce momentary time-spaced closures of the second circuit in accordance with measurements of the check meter, and means connected to the pump control and said first and second circuits and responsive to synchronous closure of said circuits to stop the pump when the difference in the measurements of the production and check meters exceeds a predetermined maximum.

7. A system as defined in claim 6 characterized further in that the production meter cam actuates the switch in the first circuit upon the measurement of each barrel of oil by the production meter, the check meter cam actuates the switch in the second circuit upon the measurement of a fixed fraction of each barrel of oil by the check meter to provide alternating series of synchronous and non-synchronous closures of said circuits when said cams are rotated relative to each other, and said means comprises a relay having the coils thereof connected to said circuits and being responsive to each series of synchronous closures of said circuits, a stepping switch connected to the pump control, and another electrical circuit connected between contacts of the relay and the stepping switch to index the stepping switch with a series of synchronous closures of the first and second circuits.

8. A system as defined in claim 6 characterized further in that the production meter is upstream of the check meter, a by-pass conduit around the check meter, a control valve in the by-pass having an electrical operator, a counter connected to the second circuit for adding the closures of the second circuit, a switch connected to the counter for actuation when the counter reaches a pre-determined reading, and an electrical circuit connected between last last-mentioned switch and the control valve operator for by-passing oil around the check meter after the check meter has measured a pre-determined volume of oil.

9. A system as defined in claim 8 characterized further in that said counter has an electrical reset, a clock, a switch carried by the clock and connected to said reset for resetting said counter at a pre-determined time each day and operating the control valve to direct oil through the check meter.

10. A system as defined in claim 6 characterized further to include a daily allowable counter having a reset and connected to said first circuit to add the number of closures of the first circuit, and a switch carried by said daily allowable counter and connected to the pump control for stopping the pump when the production meter has measured a pre-determined volume of oil between resets of the daily allowable counter.

11. A system as defined in claim 10 characterized further in that the daily allowable counter has an electrical reset, a clock, a switch operable by the clock at a pre-determined time each day, and an electrical circuit connecting the last-mentioned switch to the daily allowable counter reset for resetting said counter and starting the pump at a pre-determined time each day.

12. A system as defined in claim 10 characterized further to include a monthly allowable counter having a reset and connected to said first circuit to add the number of closures of the first circuit, and a switch carried by said monthly allowable counter and connected to the pump control for stopping the pump when the production meter has measured a pre-determined volume of oil between resets of the monthly allowable counter.

13. In a system for the automatic custody transfer of oil from a lease to a receiving pipeline, a production flow meter, a check flow meter, conduits connecting the meters in series between the lease and the pipeline, means for pumping oil from the lease through the meters and conduits to the pipeline, a pulse producing circuit connected to the production meter for producing time-spaced electrical pulses in accordance with the flow of oil from the lease to the pipeline as indicated by the production meter, a pulse producing circuit connected to the check meter for producing time-spaced electrical pulses in accordance with the flow of oil from the lease to the pipeline as indicated by the check meter, and means for registering synchronized pulses produced by the pulse producing circuits for indicating the difference in the measurements of the meters.

References Cited in the file of this patent
UNITED STATES PATENTS

| | | |
|---|---|---|
| 1,876,512 | Pfening et al. | Sept. 6, 1932 |
| 2,860,511 | Wickesser | Nov. 18, 1958 |

OTHER REFERENCES

Publication: Oil and Gas Journal, June 11, 1956, pages 110–114 (73–224).